US007580346B2

(12) United States Patent
Azenkot et al.

(10) Patent No.: US 7,580,346 B2
(45) Date of Patent: *Aug. 25, 2009

(54) METHOD AND APPARATUS TO IMPROVE SCDMA HEADROOM

(75) Inventors: Yehuda Azenkot, San Jose, CA (US); Selim Shlomo Rakib, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 638 days.

This patent is subject to a terminal disclaimer.

(21) Appl. No.: 11/326,225

(22) Filed: Jan. 4, 2006

(65) Prior Publication Data

US 2006/0123452 A1 Jun. 8, 2006

Related U.S. Application Data

(63) Continuation of application No. 09/974,202, filed on Oct. 9, 2001, now Pat. No. 7,002,899.

(51) Int. Cl.
*H04J 11/00* (2006.01)

(52) U.S. Cl. .................. 370/208; 370/252; 725/107; 725/129

(58) Field of Classification Search .......... 370/208, 370/252; 725/107, 129, 146, 148
See application file for complete search history.

(56) References Cited

U.S. PATENT DOCUMENTS

| 5,610,908 | A | 3/1997 | Shelswell et al. | ............ 370/210 |
|---|---|---|---|---|
| 6,467,092 | B1 | 10/2002 | Geile et al. | ................ 725/131 |
| 6,791,995 | B1 | 9/2004 | Azenkot et al. | ............. 370/436 |
| 2001/0055282 | A1 | 12/2001 | Knisely et al. | .............. 370/328 |
| 2002/0154620 | A1 | 10/2002 | Azenkot et al. | ............. 370/347 |
| 2002/0181604 | A1 | 12/2002 | Chen | .......................... 375/279 |

FOREIGN PATENT DOCUMENTS

WO    WO 01/39456 A1    5/2001

OTHER PUBLICATIONS

L. Papke and K. Fazel, "Combined Multilevel Turbo-code with MR-modulation" Jun. 18, 1995. pp. 668-672, German Aerospace Research Establishment (DLR), Institute for Communications Technology, 1995 IEEE.
ITU-T Telecommunication Standardization Section of ITU, "Series J: Transmission of Television Sound Programme and Other Multimedia Signals—Digital Transmission of Television Signals" ITU-T Recommendation J.83, International Telecommunication Union, Apr. 1997.

*Primary Examiner*—Melvin Marcelo
(74) *Attorney, Agent, or Firm*—McAndrews, Held & Malloy, Ltd.

(57) ABSTRACT

A method of determining when cable modems in a distributed digital data delivery service over cable TV hybrid fiber coaxial cable network have a headroom problem and resolving said problem. The method involves measuring the burst power from each cable modem, and if the burst power is too low, requesting the cable modem whose burst power is too low to increase its transmit power, and keeping track of which modems have been requested to increase their power. If a predetermined number of requests to increase power have not resulted in the cable modem transmitting with sufficient power for reliable reception, the cable modem is listed as having a headroom problem. Subsequent requests for upstream bandwidth from all modems with headroom problems are analyzed to determine if the requested burst size is too large and will result in a headroom problem. If so, a calculation as to the maximum number of spreading codes that each modem with a headroom problem can simultaneously transmit on without a headroom problem. The requested burst is then broken down into smaller burst fragments, and appropriate upstream minislot assignments adequate to transmit the burst fragments are made and sent to the cable modem.

31 Claims, 8 Drawing Sheets

METHOD AND APPARATUS TO IMPROVE SCDMA HEADROOM

CROSS-REFERENCE TO RELATED APPLICATION

This Patent Application is a continuation of U.S. patent application Ser. No. 09/974,202, filed on Oct. 9, 2001 now U.S. Pat. No. 7,002,899, entitled "METHOD AND APPARATUS TO IMPROVE SCDMA HEADROOM". The U.S. patent application Ser. No. 09/974,202, filed on Oct. 9, 2001, entitled "METHOD AND APPARATUS TO IMPROVE SCDMA HEADROOM" is hereby incorporated by reference.

BACKGROUND OF THE INVENTION

Certain cable plants are so lossy that cable modems in remote positions on the network, even when using maximum transmit power, cannot get their transmissions through to the headend modem.

The Cable Modem Termination System (hereafter CMTS) wants to receive bursts from all the remote modems at approximately the same power level regardless of where on the HFC network the modem resides. To accomplish this end, the CMTS receiver in DOCSIS systems for digital data delivery over hybrid fiber coax controls the power of transmissions by each remote modem by a downstream message to each modem. The CMTS controls the power level of transmissions to it by the remote modems so as to keep the received power of each burst at the CMTS within the gain controlled range of the CMTS receiver so as to not saturate its A/D converter and so as to use the full dynamic range of the A/D converter. However, in very lossy systems, some transmitters in the more remote cable modems cannot output enough power to achieve the desired signal power level at the CMTS modem even when their transmit amplifiers are set to maximum transmit power. This causes problems for the CMTS modem, because it does not receive the burst it was expecting from each of these remote modems and some will be outside the range of the AGC and will not be using the full dynamic range of the A/D converter.

Nothing can be done at the remote modem to remedy the problem because the gain of the transmit amplifiers of the remote modems that are having the problem is already set to maximum power. Likewise, nothing can be done at the CMTS modem to remedy the problem since neither the dynamic range of the A/D converter nor the gain controlled range of the CMTS receiver can be changed, so signals with insufficient power will not use the full dynamic range of the A/D converter and will be outside the automatic gain control's ability to control the amplitude of the signal. Nothing can be easily done to lessen the losses in the HFC network.

Something must be done to get more power out of the remote modem without physically putting a more powerful amplifier in it. This problem will be referred to herein as the headroom problem.

Therefore, a need has arisen for an apparatus and method to increase the power of remote modems in lossy systems without actually physically changing the power of the modem transmitter to avoid headroom problems.

SUMMARY OF THE INVENTION

The genus of the invention is characterized by detecting the fact that one or more remote unit modems or remote transceivers in a distributed code division multiple access (CDMA) or orthogonal frequency division multiplexed system (also known as a Discrete Multitone or DMT or OFDM system) has a headroom problem and resolving it by reducing the number of spreading codes or frequency components that modems/transceivers which have headroom problems can use per burst. From this point forward, the invention will be discussed in terms of its application to a CDMA system, but a short section illustrating its application to a DMT system will be included at the end of the summary. Limitation of the total number of codes (or Fourier component frequency carriers) allocated to a transmitter with a headroom problem causes the total amount of transmit power of the remote transceiver to be spread among fewer codes (or carriers) thereby causing the data spread by each code (or transmitted on each carrier) to be transmitted with more power.

This method of solving the headroom problem usually involves breaking large bursts up into a number of smaller bursts which are small enough to cause an artificial restriction on the number of spreading codes needed to send the burst, the number of codes being small enough to solve the headroom problem. The teachings of the invention are applicable to any distributed code division multiplexed digital data communication system wherein a plurality of distributed remote transceivers transmit upstream spread spectrum data to a central transceiver.

Cable modems have a power specification typically expressed in X dBmV. What this means is that if all the available spreading codes are used to transmit a burst, the measured power per code at the output of that cable modem will be X dBmV. The total available transmit power of any cable modem is always divided between the number of codes upon which it is simultaneously transmitting. By restricting the number of codes that can be assigned to a particular cable modem, the amount of power per code that the cable modem transmits increases linearly with the reduction in the number of codes. The number of codes can be limited by limiting the maximum burst size the cable modem can transmit at any particular time to a maximum burst size that maps to a smaller number of codes that will solve the problem.

The invention is as applicable to DMT systems as it is to CDMA systems. In a DMT system, a plurality of Fourier frequency components are used as individual carriers and are shared among a plurality of remote transmitters. The remote transmitters request bandwidth and are normally awarded all the available carriers to transmit portions of their burst data upon. Portions of the data to be sent are modulated upon each of the assigned Fourier component frequency carriers. The carriers are then combined into one transmitted signal by computing an inverse Fourier transform on all the modulated carriers. At the headend, the received signal is subjected to a Fourier transform and separated into all of its frequency component carriers. Each carrier is then demodulated to recover the data.

If the system is lossy such as in older cable systems frequently found in Japan (the transmission medium does not have to be hybrid fiber coax), some of the more remote transmitters may have a headroom problem when transmitting on all the DMT carriers. If so, this will cause the signal to be received with inadequate power at the headend despite transmitting at maximum power at the remote transmitter. The invention can be applied in this situation by detecting the headroom problem in any way, and restricting the assignment of DMT carriers to remotes having a headroom problem to fewer than all the available carriers. If a remote is transmitting on fewer than all the DMT carriers, the total available transmit power is divided among fewer carriers so the power per carrier is increased. The amount of restriction is set to solve the headroom problem so that the power per carrier is sufficient that the headend receiver can receive each carrier with adequate signal-to-noise ratio for reliable reception.

The headroom problem can exist in a cable modem system which uses CDMA or DMT or in any other type CDMA or DMT system using a different transmission medium. The headroom problem can also exist in any other system using a form of multiplexing where the data to be transmitted from any one of a plurality of remote transmitters to a headend receiver is transmitted simultaneously on a plurality of upstream logical channels that are multiplexed from each other in any way other than time division multiplexing such that the total available transmit power is divided among all the channels that are simultaneously used. In a broad statement of the inventive process applicable to all of the above identified types of systems, a headroom problem is typically solved by: (1) recognizing in any way at the CMTS or headend transceiver that a particular cable modem or remote transceiver does not have enough power when using all available spreading codes or DMT carriers or other logical channels upon which simultaneous transmission is attempted to meet a minimum nominal power needed at the CMTS for reliable reception; and (2) restricting the number of spreading codes or DMT carriers or upstream logical channel assigned to any remote transceiver or cable modem for simultaneous upstream transmission such that the power transmitted on each code or carrier or other logical channel is sufficient to overcome the headroom problem.

Typically, the headroom problem is solved for a remote transmitter or cable modem with a known headroom problem in the following way. The following steps assume application of the teachings of the invention to a CDMA system where the number of spreading codes, i.e., logical channels, used for simultaneous transmission of data of the burst by said remote transmitter or cable modem is determined directly or indirectly from the size of the burst such as is the case in the DOCSIS CDMA systems. In such systems, the headroom problem is solved by: (1) determining the power shortfall of a remote transmitter or cable modem that has a headroom problem and using said power shortfall to calculate the maximum burst size that the remote transmitter or cable modem can transmit which will result in mapping to a sufficiently restricted number of spreading codes and spreading intervals such that transmissions from this remote transmitter or cable modem on each spreading code will arrive at the CMTS or headend receiver with the proper nominal power level or at least a power level that is adequate to allow the CMTS or headend receiver to receive the transmissions with a sufficiently low bit error rate for reliable reception; (2) receiving upstream bandwidth requests from a modem that has a headroom problem which gives the burst size the modem has to transmit; (3) examining the burst size of the requested burst, and if the requested burst size is too big for this remote transmitter or cable modem given its headroom problem, determining how many pieces this burst needs to be broken into so that the maximum burst size of any fragment is the same as the maximum burst size calculated in step 1 and maps to a number of minislots that maps to a number of spreading codes and spreading intervals which is sufficiently small to solve the headroom problem; and (4) sending one or more downstream messages to each remote transmitter or cable modem which has a headroom problem which requested bandwidth for an upstream burst, each said downstream message(s) allocating for a burst fragment calculated in step 3 a number of minislots during which said burst fragment may be transmitted, said number of minislots for each burst fragment mapping to the number of spreading codes and spreading intervals needed to transmit a burst fragment of that size.

This technique of fragmenting bursts into smaller segments which require a smaller number of codes calculated to solve the headroom problem efficiently increases the received power per code from each modem with a headroom problem without a physical modification of the modem's transmitter.

DETAILED DESCRIPTION OF THE PREFERRED AND ALTERNATIVE EMBODIMENTS

Figure 1:
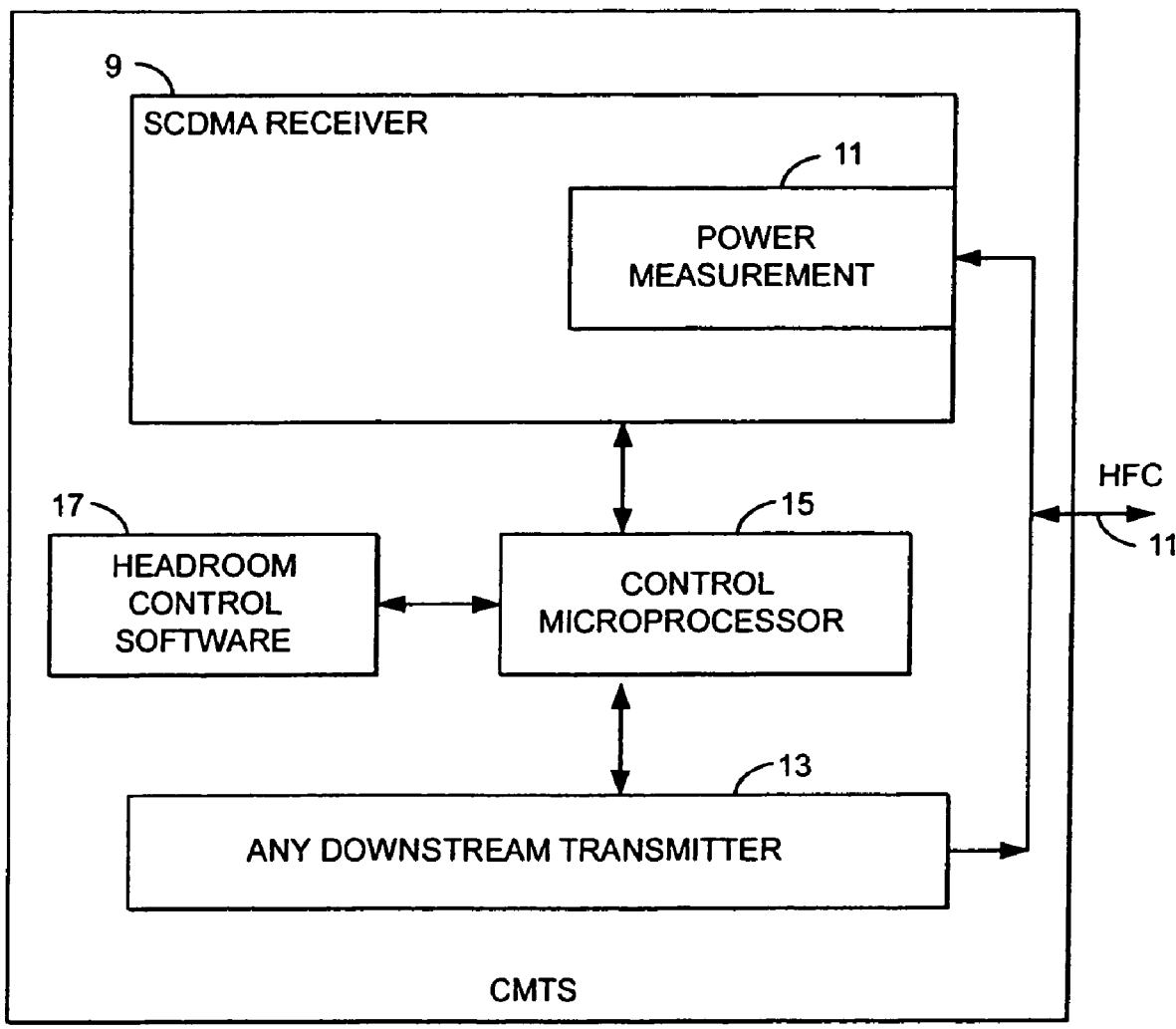
FIG. 1 is a block diagram of a generic cable modem termination system or CMTS in which the invention may be implemented.

Spreading the spectra of data by code division multiple access causes the power of a burst to be spread out over time and over the allocated bandwidth. This is because, in contrast with TDMA when the entire symbol is transmitted in one symbol time, in CDMA, each symbol is transmitted over a large number of chip clock cycles where the chip clock is running much faster than the symbol clock. This spreads the spectrum of the symbol, but results in less power being transmitted during any particular interval. Thus, over any particular interval of time, less power is received with the spread spectrum signal than would have been received had the original burst not been spread although the total energy received if the power is integrated over time would be the same. If more chips are used per symbol, less power can be used to transmit a symbol and it will still get through.

With multiple remote transceivers all transmitting over a shared media to a single CMTS headend transceiver using CDMA, the remote transceivers can all transmit simultaneously using different assigned spreading codes. The total power the CMTS receives is the sum of the power transmitted oh each of the spreading codes. The invention is to restrict the number of codes that can be assigned to a remote transceiver that has a headroom problem during the mapping process such that the amount of power transmitted on each code by the remote transceiver is greater thereby overcoming the headroom problem.

To understand this, consider the following. In DOCSIS systems, the upstream is divided into minislots which is a form of time division multiplexing. Other patent applications of the assignee explain how synchronous code division multiplexed bursts can be transmitted in the upstream minislots. This is done by mapping symbols to be transmitted upstream into a two dimensional space having spreading codes on the vertical axis and spreading intervals over time on the other orthogonal axis.

The remote transceiver sends a request to the CMTS when the remote transceiver has data to send. This request tells the CMTS how many symbols the remote transceiver has to send in a burst. The CMTS responds with a message indicating which minislots have been assigned to the remote transceiver to transmit the burst. The symbols of the burst then will be transmitted during multiple spreading intervals using multiple codes that map to the assigned minislots. The transmission of some symbols occurs simultaneously during the same spreading interval but spread by different codes. This is done by mapping the individual symbols to various codes and various spreading intervals in the two dimensional space until all symbols have been accounted for.

For remote transceivers that have large bursts to send, the CMTS will normally assign enough minislots to accommodate all the symbols of the burst. However, for remote transceivers that have headroom problems and have their transmit powers set to maximum but which still are not getting a strong enough signal to the CMTS, the CMTS will solve the headroom problem by restricting the number of codes the remote can use. This is done by breaking large bursts up into smaller segments and then making assignments of minislots for these smaller segments. This causes the number of codes used to transmit each smaller segment to be artificially limited to a smaller number of codes thereby increasing the power transmitted on each code to the CMTS. This is because the total power transmitted by a remote transceiver is divided among the spreading codes which it is using to simultaneously transmit data. By artificially restricting the number of codes a remote transceiver is assigned to transmit, the total power transmitted on each spreading code by that remote transceiver that has the headroom problem is increased without actually altering the circuitry of the transmitter.

An advanced DOCSIS CMTS receiver capable of implementing the invention and capable of receiving multiple burst types using synchronous code division or time division multiplexing is disclosed in a U.S. patent application entitled HEAD END RECEIVER FOR DIGITAL DATA DELIVERY SYSTEMS USING MIXED MODE SCDMA AND TDMA MULTIPLEXING, filed Feb. 23, 2001 and having Ser. No. 09/792,815, which is hereby incorporated by reference. The invention is an improvement in the software of the CMTS that implements at least the steps given in FIG. 2, or FIGS. 3A and 3B and, in some species, implements the steps in FIGS. 4A through 4C. In the system disclosed in this 09/792,815 specification, multiple different modems capable of transmitting different types of bursts with different multiplexing all coexist in the same system, and all transmit to the same CMTS modem. The CMTS modem in these advanced system needs to receive a training burst from every modem to determine equalization coefficients for use in receiving that modem's bursts and to calculate a ranging offset. The ranging offset calculated by the CMTS for each remote modem is a delay which, when imposed by that modem, will cause TDMA and SCDMA bursts from that modem to arrive aligned in time at the CMTS with minislot boundaries or timeslot boundaries of the timeslots assigned to each remote modem's burst. Synchronization decreases intersymbol interference.

To accomplish this, the CMTS modem transmits a downstream message telling all the modems when a training window in the upstream will be opened up. No payload data is transmitted during this training window, and all modems which have not yet accomplished training will transmit a training burst to the CMTS receiver. It is important for the training burst of each modem to be received properly including modems with headroom problems, because if the training burst of a modem does not get properly processed, that modem will not be able to transmit to the CMTS. Training bursts are TDMA and can be QPSK modulated with error correction code which means these bursts can be detected and effectively used at even low signal-to-noise (SNR) ratios below 10 dB. Because of the simple modulation scheme of the training bursts, it is possible for the CMTS receiver to properly receive training bursts from remote modems that have headroom problems even though the training bursts are 10 dB below the nominal power ordered by the CMTS when received at the CMTS.

Figure 3A:
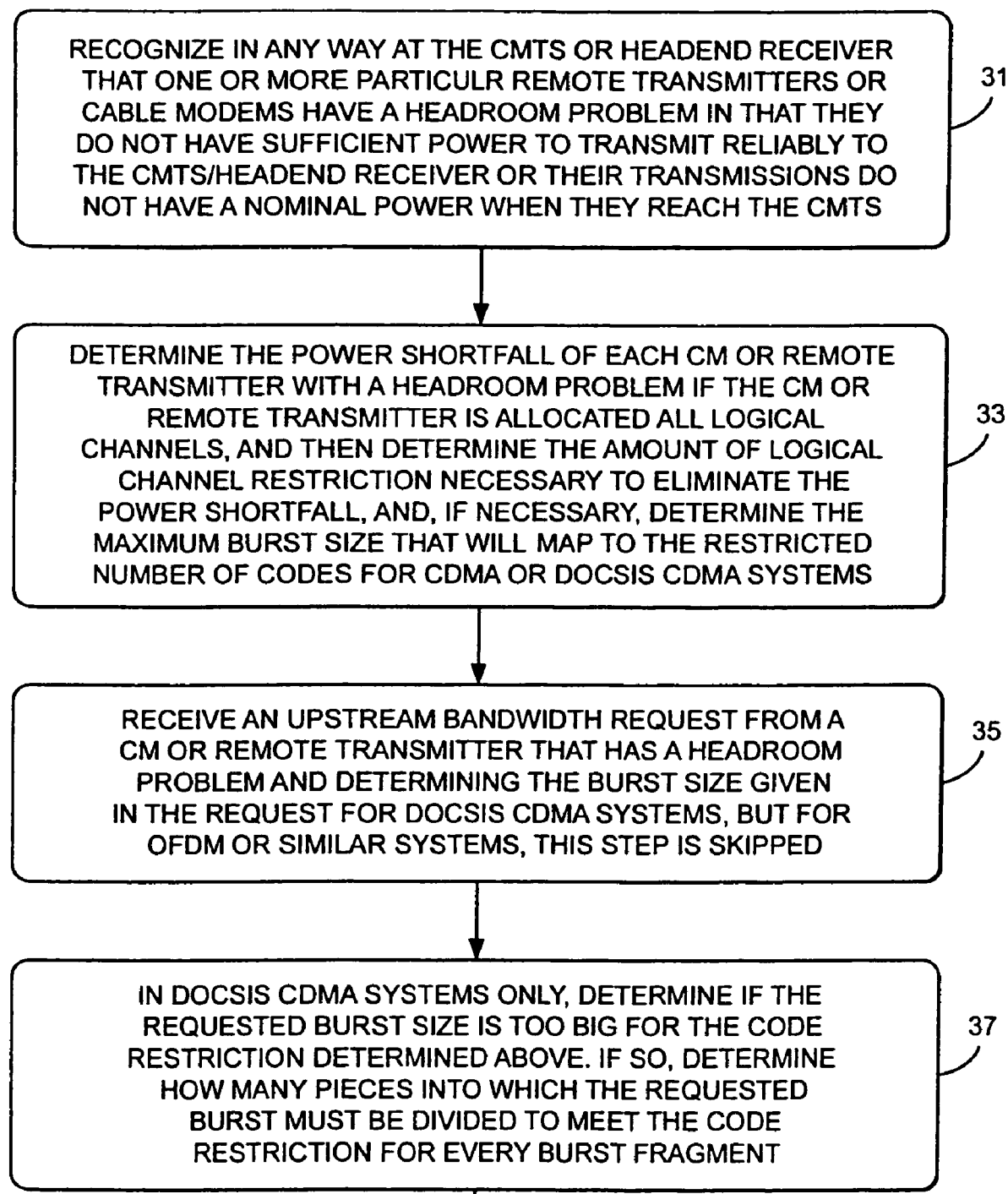
FIGS. 3A and 3B comprise a flowchart of a generic process to recognize that a headroom problem exists in any CDMA system or DOCSIS CDMA system or any orthogonal frequency division multiplexed system or other system where multiple logical channels are used simultaneously by a single remote transmitter or cable modem to transmit data upstream.
Figure 3B:
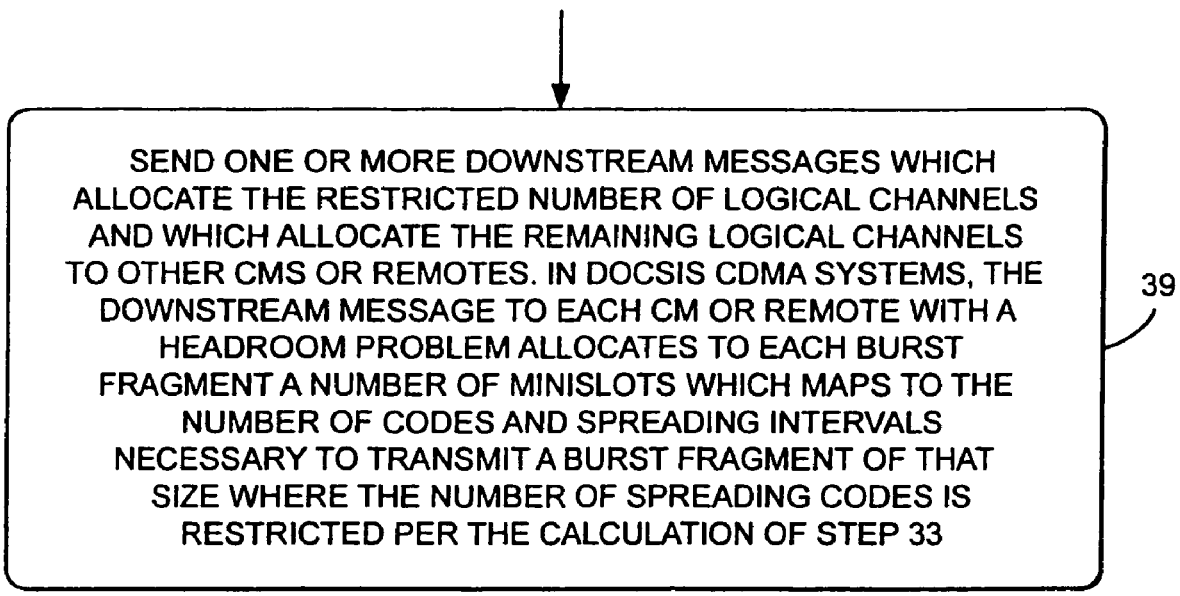

In the species of the invention represented by FIGS. 3A through 3C, the fact that a modem has a headroom problem is detected during the initial training burst and one or more subsequent periodic station maintenance bursts by measuring the power of received bursts and comparing them to a nominal power level. If a CM's burst is below the nominal power level, it is asked to increase its transmit power. If the CM is asked at least twice to increase its power level and still cannot transmit with sufficient power to meet the nominal power specification, the CMTS concludes that the CM has a headroom problem. In other embodiments, the CMTS may determine that the CM has a headroom problem if the initial training burst is too low in power and the CMTS asks the CM to increase its power and the next burst received from the CM is still too low in power.

FIG. 1 is a block diagram of a CMTS that can be used to implement the invention. It comprises any type of code division multiplexed (CDMA) or synchronous code division multiplexed receiver (SCDMA) 9 capable of receiving CDMA or SCDMA bursts, respectively, from multiple cable modems (CMs). DOCSIS SCDMA receiver circuitry such as is available commercially from the assignee Terayon Communications Systems, Inc. of Santa Clara, Calif. is the preferred embodiment. Such DOCSIS SCDMA receiver circuitry is described in U.S. patent application Ser. No. 09/792,815 which is hereby incorporated by reference. The receiver circuitry 9 must have some circuit or process 11 which is capable of evaluating the received bursts from each cable modem to ascertain if the burst meets a nominal power requirement or has a signal-to-noise ratio or a bit error rate which is adequate to ensure reliable reception. The receiver circuitry 9 preferably has circuitry and/or software processing represented by block 11 capable of measuring the power of a burst from each CM received on any transmission medium 11 and comparing the measured power to a nominal power.

The transmission medium is typically hybrid fiber coaxial cable (HFC), but it can be any other transmission medium as well such as pure fiber, twisted pair, wireless, satellite uplink and downlink, etc.

The CMTS also has any type of generic downstream transmitter 13 which transmits downstream data and messages to the CMs.

A control microprocessor 15 controls and exchanges data with both the transmitter and receiver and executes software, represented by block 17, which solves the headroom problem. The software of block 17 which resolves the headroom problem can any process within the genus represented by FIG. 2, or the genus represented by FIGS. 3A and 3B or the process of the preferred embodiment represented by FIGS. 4A through 4C.

Figure 2:
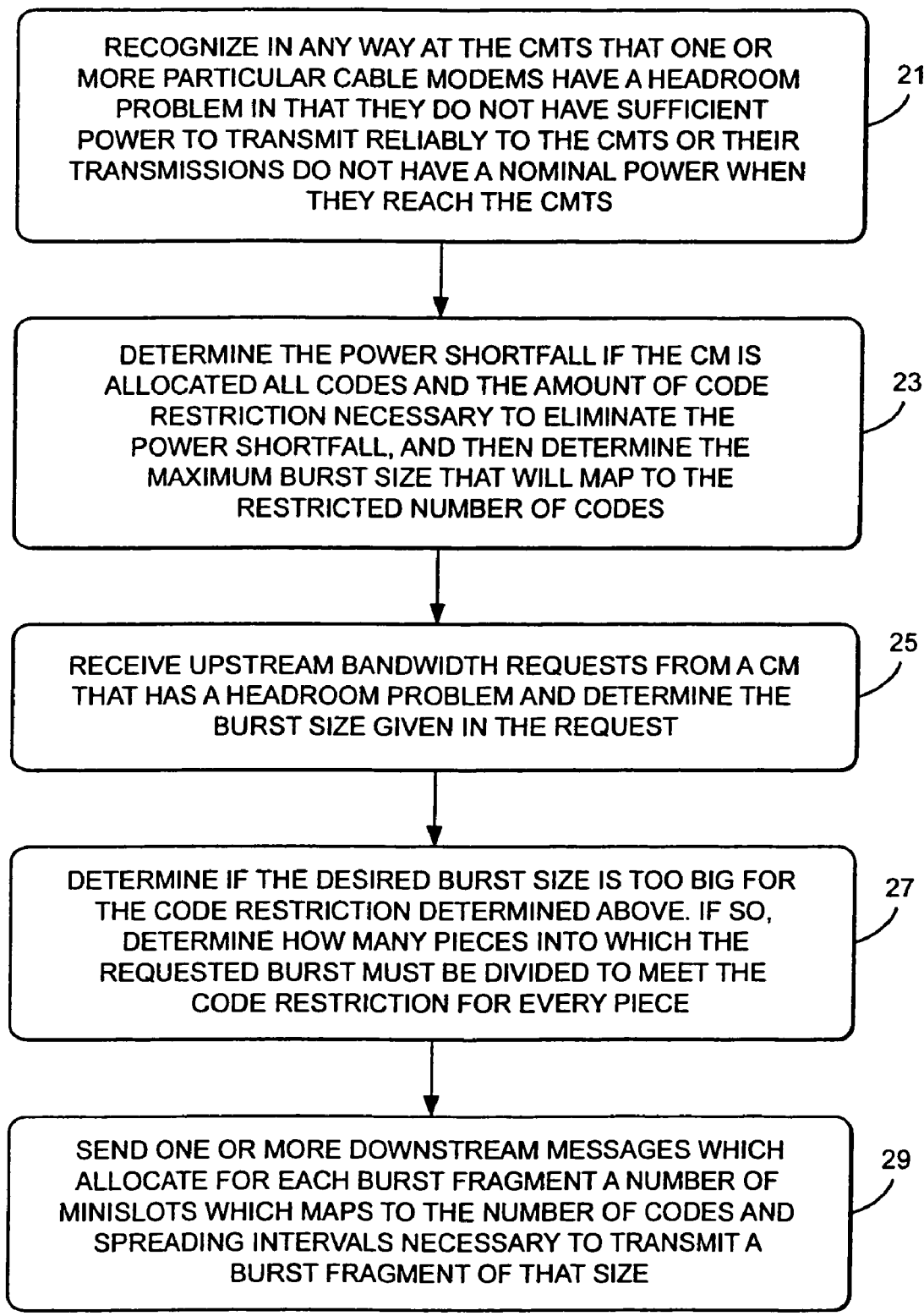
FIG. 2 is a flowchart of a generic process to recognize that a headroom problem exists and solve it in a cable modem DOCSIS CDMA type system.

A generic flowchart defining the minimum steps needed in a process to solve the headroom problem in DOCSIS CDMA systems where spreading codes are allocated based upon allocated upstream minislots which, in turn, is usually controlled by burst size is shown in FIG. 2. Step 21 represents any process carried out by the CMTS of determining which, if any, CMs have headroom problems. The CMTS can determine that a CM has a headroom problem in any way and still be within the genus of the invention. For example, the CMTS may measure the burst power and compare it to a nominal power level and make a request to the CM to increase its power and to transmit another burst at the increased power level at another time designated in the message or just increase its training burst power transmitted in response to the next training burst invitation the CM receives and then record the fact that the request was made to this particular CM. When the new burst from the same CM arrives, its power is measured again and compared to a nominal power level. If the power is too low again, the CMTS may conclude at that point that the CM has a headroom problem. In other species, the CM may ask the CM to increase its power yet again and request the CM to send a new burst at a specified time or in response to the next training burst invitation. Then the new burst is again measured and compared to a nominal power reference, and, if it is still too low in power, the CMTS may conclude, after checking a table where requests to specific CMs to increase their power are recorded, that the CM has a headroom problem. Any reasonable number of iterations like this may be used in alternative embodiments.

The only thing that is necessary in terms of power in CM bursts is that the CM transmit with enough power that the CMTS can receive bursts from the CM with a sufficiently low bit error rate for reliable reception. Thus, it is not necessary that all CM bursts arrive with the same power level at the CMTS as long as they all arrive with sufficient power to enable reception with a sufficiently low bit error rate. Thus, step 21 also represents species in which the CMTS detects a headroom problem by not using a nominal power level as a reference but by using a reference bit error rate which must not be exceeded. In these type embodiments, the CMTS can check the bit error rate of training bursts after minimizing errors as much as possible by adjusting gain and phase error correction factors as much as possible in a rotational amplifier feeding a slicer detector to minimize detection errors. If the bit error rate is still too high, the CMTS sends a message to the CM asking it to increase the power of its next training burst. The process is then repeated until a power level is found which causes a sufficiently low bit error rate. If no power level can be found which lowers the bit error rate sufficiently, then the CMTS concludes that the CM has a headroom problem, and takes remedial action.

Step 23 represents the process wherein the CMTS determines the amount of the power shortfall if the CM is allocated all codes and determines the amount of code restriction necessary to eliminate the power shortfall. The CMTS then determines the maximum burst size that will map to a number of codes that is sufficiently restricted to eliminate the headroom problem. This is easy to do in embodiments where a nominal power level is used since the power of the last burst received which caused the CMTS to conclude there was a headroom problem was measured and can be compared to the nominal power. In embodiments where no nominal power is used and CMs transmit at whatever power level gives sufficient reception accuracy, the CMTS may determine the power shortfall in any way. One such alternative embodiment is to use a nominal power level just for CMs that the CMTS concludes have headroom problems. Another alternative embodiment is for the CMTS to measure the power or bit error rate of the burst upon which the CMTS concludes there is a headroom problem for a particular CM and then assume that an increase of a predetermined amount of power will solve the problem and then impose a suitable code restriction to get that increased level of power. Another alternative embodiment is for the CMTS to measure the power of the burst which caused the CMTS to assume that there was a headroom problem. Then, that power level is used as a search key to look up an increased level of power in a look up table which contains experimentally determined values of power or increases in power or restrictions in the number of codes to be assigned which are known to solve headroom problems given the last burst's power level. Another alternative embodiment is to use the look up table but measure the bit error rate of the last burst which caused the CMTS to conclude a CM had a headroom problem and use the bit error rate as the search key in the look up table or as a variable in any suitable mathematical equation.

Step 25 represents the process of receiving upstream bandwidth requests from a CM that has a headroom problem and determine the burst size given in the bandwidth request. In most if not all systems, when a CM makes a bandwidth request, it includes with the request an indication of the amount of data it needs to send in terms of a burst size. Step 25 reads this number.

Step 27 represents the process in the CMTS of determining for any particular upstream bandwidth request whether the bandwidth request comes from a CM with a headroom problem and the desired burst size is too large and will cause a headroom problem to exist if the burst is sent all in one transmission. Step 27 also represents the process carried out by the CMTS of determining, if the burst size is too large, into which how many pieces the burst must be divided to meet the code restriction for every piece so as to solve the headroom problem. In the preferred embodiment, the restricted number of spreading codes determined in step 27 is used for all subsequent upstream bandwidth assignments to the cable modem that made the upstream bandwidth request and which has a headroom problem. In alternative embodiments useful in systems where losses can vary over time and a CM or remote transmitter may not always have a headroom problem, the process of determining when the CM or remote has a headroom problem and determining an adequate restriction can be performed periodically or upon every upstream burst request from that CM or remote.

Finally, in step 29, the CMTS sends one or more downstream messages to the CM which has the headroom problem and which requested upstream bandwidth. These messages allocate for each burst fragment a number of minislots which maps to the number of codes and spreading intervals necessary to transmit a burst fragment of that size. This will be a restricted number of codes which solves the headroom problem.

Referring to FIGS. 3A and 3B, there is shown a flowchart of a generic process to recognize that a headroom problem exists in any CDMA system or DOCSIS CDMA system or any orthogonal frequency division multiplexed (OFDM) system or other system where multiple logical channels are used simultaneously by a single remote transmitter or cable modem to transmit data upstream. The first task, represented by step 31 is to recognize which of the plurality of remote transmitters or cable modems have headroom problems. This can be done in any way, but always involves recognition that the transmissions of any remote transmitter or cable modem which has a headroom problem are not arriving at the headend receiver or CMTS with a nominal power level or at least an adequate signal-to-noise ratio for reliable reception. In the preferred embodiment, as described below, the recognition of a headroom problem involves measuring the power of training bursts, and comparing the measured power to a reference or nominal power. If the measured power is too low, the headend sends requests to remote transmitters or cable modems which are too weak requesting them to increase their transmit power level. If after a predetermined number of times through the cycle of receiving a training burst, measuring its power and sending a downstream request to increase transmit power, the transmissions from a remote transmitter or cable modem are still too weak, then the headend receiver or CMTS concludes the remote transmitter/cable modem has a headroom problem.

Another way of determining that a cable modem or remote transmitter has a headroom problem comprises: measuring the signal-to-noise ratio or bit error rate or both of a burst from each cable modem or remote transmitter and comparing said measurement to a reference; if the measured quantity is unfavorable compared to said reference, requesting the cable modem or remote transmitter to increase the power of transmission of a subsequent burst, and then measuring the signal-to-noise ratio or bit error rate or both of said subsequent burst and comparing the measured quantity to the reference; if said measured quantity compares unfavorably to said reference, either concluding the cable modem or remote transmitter which sent said burst has a headroom problem, or, for one or more additional times, repeating the process of requesting an increase in power of a subsequent burst and measuring the signal-to-noise ratio or bit error rate or both of said subsequent burst and comparing the measured quantity to said reference, and if said comparison is still unfavorable, concluding that said cable modem or remote transmitter has a headroom problem.

The next step, represented by 33, is to determine the amount of power shortfall each cable modem or remote transmitter would have if all the upstream logical channels were allocated to it for simultaneous transmission of data from a burst. The term logical channel is intended to mean the channel formed by whatever form of multiplexing is used to separate the data from the channels. In the case of code division multiplexing, each logical channel is represented by one spreading code. In the case of orthogonal frequency division multiplexing, each logical channel is represented by one Fourier frequency component carrier. In other types of systems where some other form of multiplexing is used to create separate logical channels which are used simultaneously by the same cable modem/remote transmitter for upstream transmissions the term upstream logical channel is intended to designate whatever other type of multiplexing is used. The invention is applicable however only to systems wherein separate logical channels are used simultaneously by the same cable modem (hereafter CM) or remote transmitter (hereafter remote) and this would exclude the separate logical channels created by timeslots in TDMA.

In step 33, after the amount of power shortfall is determined, the required amount of restriction in assigned logical channels that will solve the problem is calculated or determined using a look up table. This calculation or determination (hereafter simply referred to as a calculation) is based upon an assumption. If a CM or remote does not have a headroom problem and sends a request to transmit an upstream burst, it is common for all the available codes or carriers or other logical channels to be assigned to that CM or remote for simultaneous transmission of data from the burst. It is assumed this will be the case for each CM or remote. For any CM or remote, assignment of all the logical channels will cause the total available transmit power to be divided by the total number of channels assigned such that each channel only receives a fraction of the total available power. For a CM or remote with a headroom problem, that fraction will be insufficient to enable reliable reception because of the losses in the transmission medium. Step 33 determines just how much short each CM or remote is of the power needed to overcome the losses and enable reliable reception.

This calculation of the power shortfall can take several forms depending on the type of multiplexing used. If a CDMA DOCSIS system is providing the logical channels, each code is one logical channel so the calculation is how many logical channels can be simultaneously used and still have adequate transmit power on each logical channel to overcome the headroom problem. This number of logical channels is the maximum number of codes that can be allocated to a CM or remote with a headroom problem. The maximum number of codes translates in a DOCSIS CDMA system to a maximum burst size. This is because when a request for an upstream burst is made, normally a number of minislots is awarded that is adequate to send the whole burst in CMs or remotes without headroom problems. Those minislots are mapped to multiple spreading intervals and multiple spreading codes automatically. For a CM or remote with a headroom problem, this assignment of enough minislots to send the whole burst will result in mapping to a number of spreading codes which is too large such that the power per channel is too small for reliable reception. To overcome the headroom problem, the allocated minislots must be a smaller number which will map to a number of spreading codes which is small enough that adequate power is available on each logical channel to overcome the headroom problem. Thus, the calculation is how small must the minislot window be that is allocated to a CM or remote with a headroom problem such that a burst fragment will be sent which maps to a number of spreading codes which is small enough to overcome the headroom problem. This is the meaning of calculating the amount of logical channel restriction necessary to eliminate the power shortfall. In other words, the maximum number of codes is determined by determining the power needed per logical channel to achieve reliable reception.

In some embodiments including both DOCSIS CDMA and OFDM or other similar systems where multiple logical channels are used simultaneously by a single CM or remote, the calculation of the necessary logical channel restriction may be done a different way. In these alternative embodiments, the calculation is made using the measurement of the actual power of the received training burst as compared to the power needed to overcome the headroom problem to determine how much additional power is needed per channel. This additional power may then be plugged into a suitable mathematical formula or used to search a lookup table to determine the maximum number of spreading codes or logical channels that can be assigned to a CM or remote with that level of power shortfall.

All these shortfall calculations assume that the training burst was sent with the power that it would receive if all the available spreading codes or logical channels had been assigned to the CM or remote for the training burst. The maximum number of codes is determined then by determining what portion of the total available power of each CM transmitter is needed to overcome the losses.

In the preferred embodiment, the restricted number of spreading codes or logical channels determined in step 33 is used for all subsequent upstream bandwidth assignments to the cable modem that made the upstream bandwidth request and which has a headroom problem. In alternative embodiments useful in systems where losses can vary over time and a CM or remote transmitter may not always have a headroom problem, the process of determining when the CM or remote has a headroom problem and determining an adequate restriction can be performed periodically or upon every upstream burst request from that CM or remote.

Step 35 represents the process of receiving an upstream bandwidth request from a cable modem or remote transmitter that has a headroom problem and determining the size of the requested burst for DOCSIS CDMA systems only. For OFDM or similar systems, there is no need to determine the burst size since there is no mapping from burst size to a plurality of spreading codes. In OFDM systems, it is only necessary to determine the amount of power shortfall and then calculate a restricted number of logical channels which will increase the power per channel to a level sufficient to overcome the losses and solve the headroom problem. So in OFDM and similar systems, step 35 is skipped, and only step 33 is necessary. Upstream bandwidth requests from CMs or remotes that do not have headroom problems are processed normally, and that processing is not shown in FIG. 3.

Step 37 is another step which is not needed for OFDM or similar systems but is needed for DOCSIS systems. In step 37, a determination is made (in DOCSIS CDMA systems only) whether the desired burst size is too big for the code restriction calculated in step 33. If so, then a calculation is made of the number of fragments into which the burst must be divided such that each fragment will map into less than or equal to the maximum number of codes which can be assigned to this CM or remote, as calculated in step 33. In OFDM or similar systems, step 37 is skipped.

Step 39 represents the process in OFDM and similar systems as well as DOCSIS CDMA systems of sending one or more downstream messages to the CMs or remotes that have headroom problems authorizing use of only the restricted number of logical channels calculated in step 33. The remaining logical channels can be allocated to other CMs or remotes. In DOCSIS CDMA systems, step 39 takes the form of sending a downstream message to each CM or remote that has a headroom problem that allocates only enough minislots to transmit the first burst fragment of the sized calculated in step 37. That burst size will map to a number of spreading codes which is small enough to resolve the headroom problem. Subsequent downstream messages are sent to CMs or remotes with headroom problems, each subsequent message authorizing use of a number of upstream minislots adequate to send the next burst fragment. ***

Figure 4A:
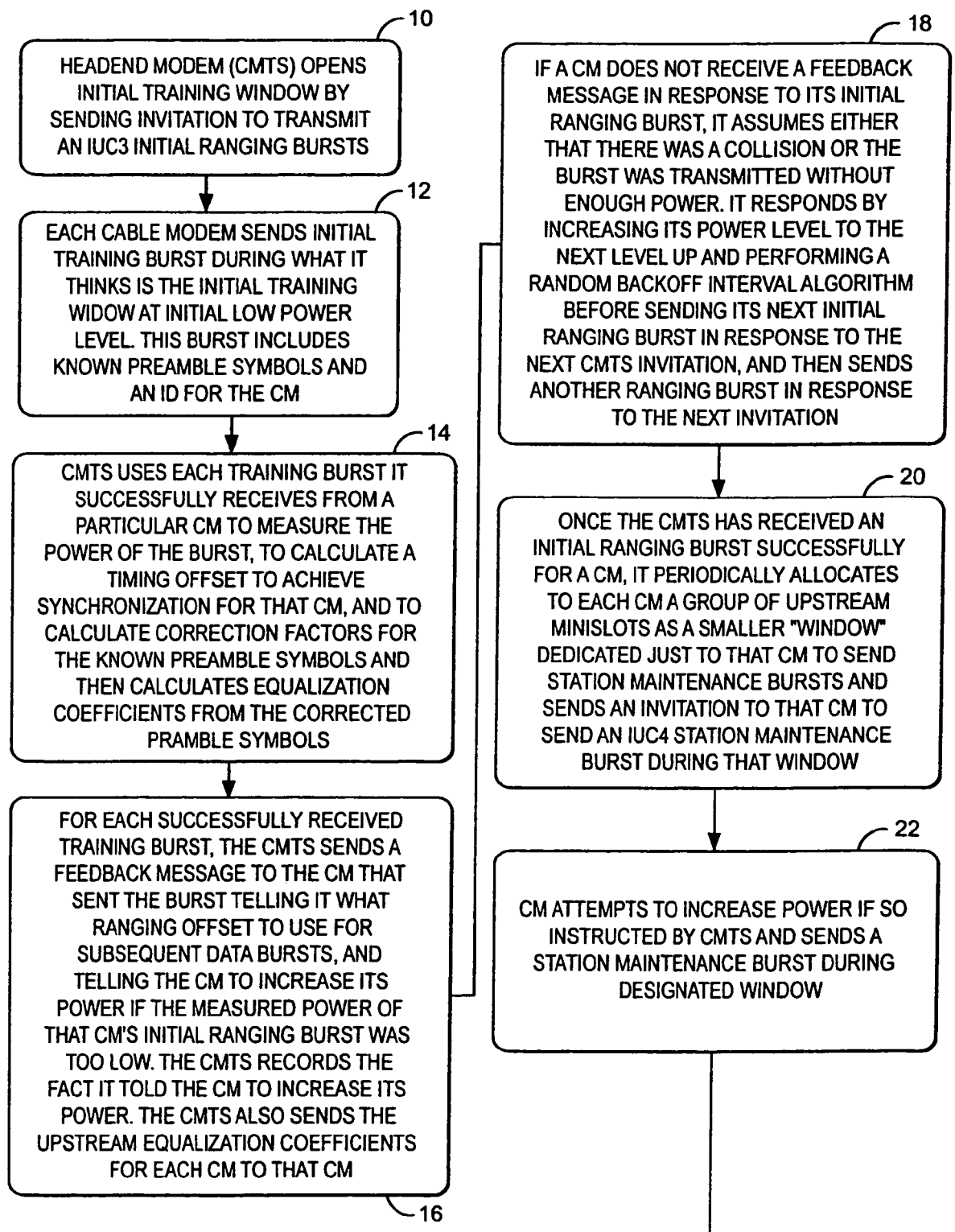
FIGS. 4A through 4C are a more detailed flowchart of one species within the genus of the invention to implement the invention in a DOCSIS system.
Figure 4B:
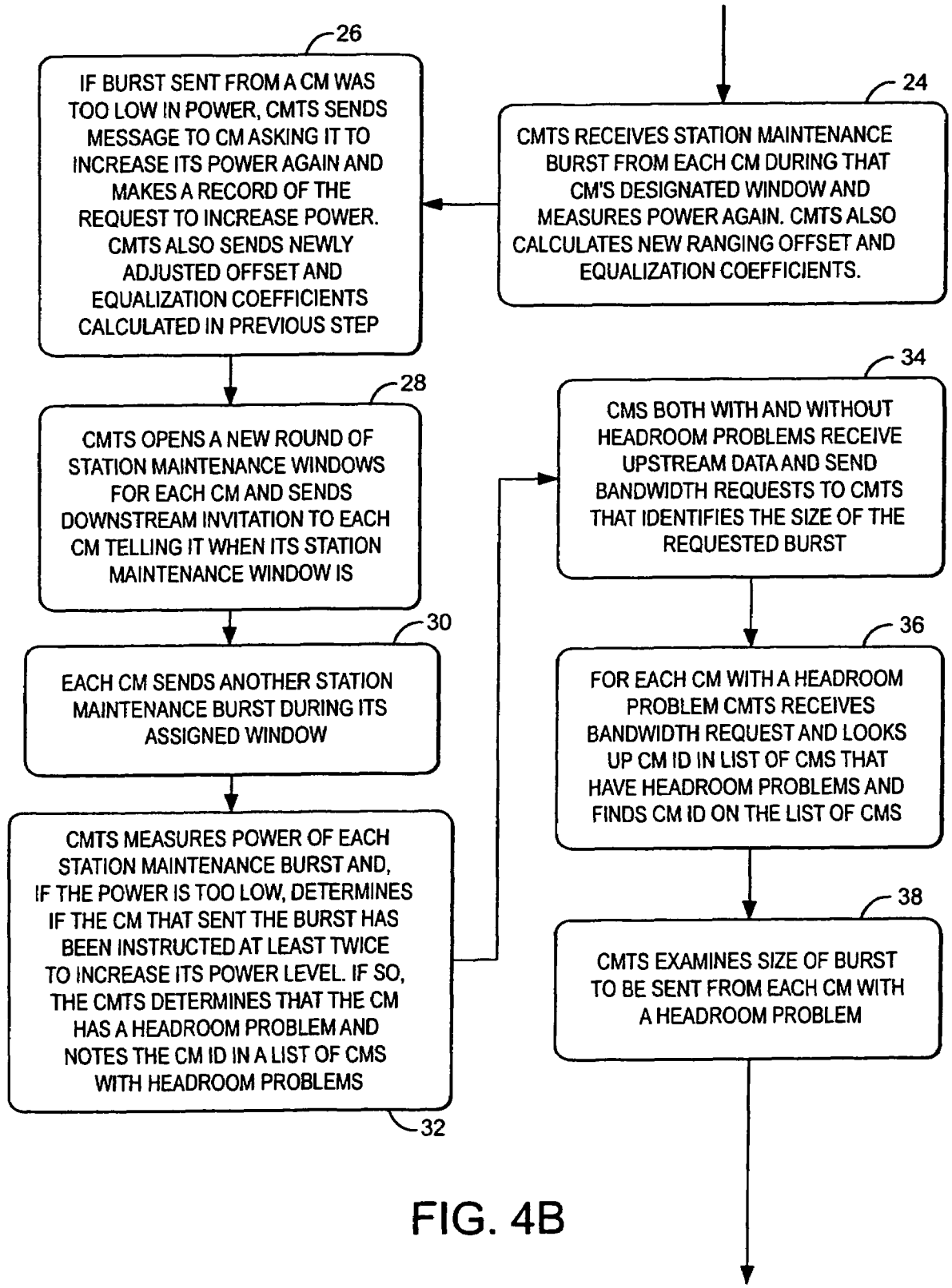
Figure 4C:
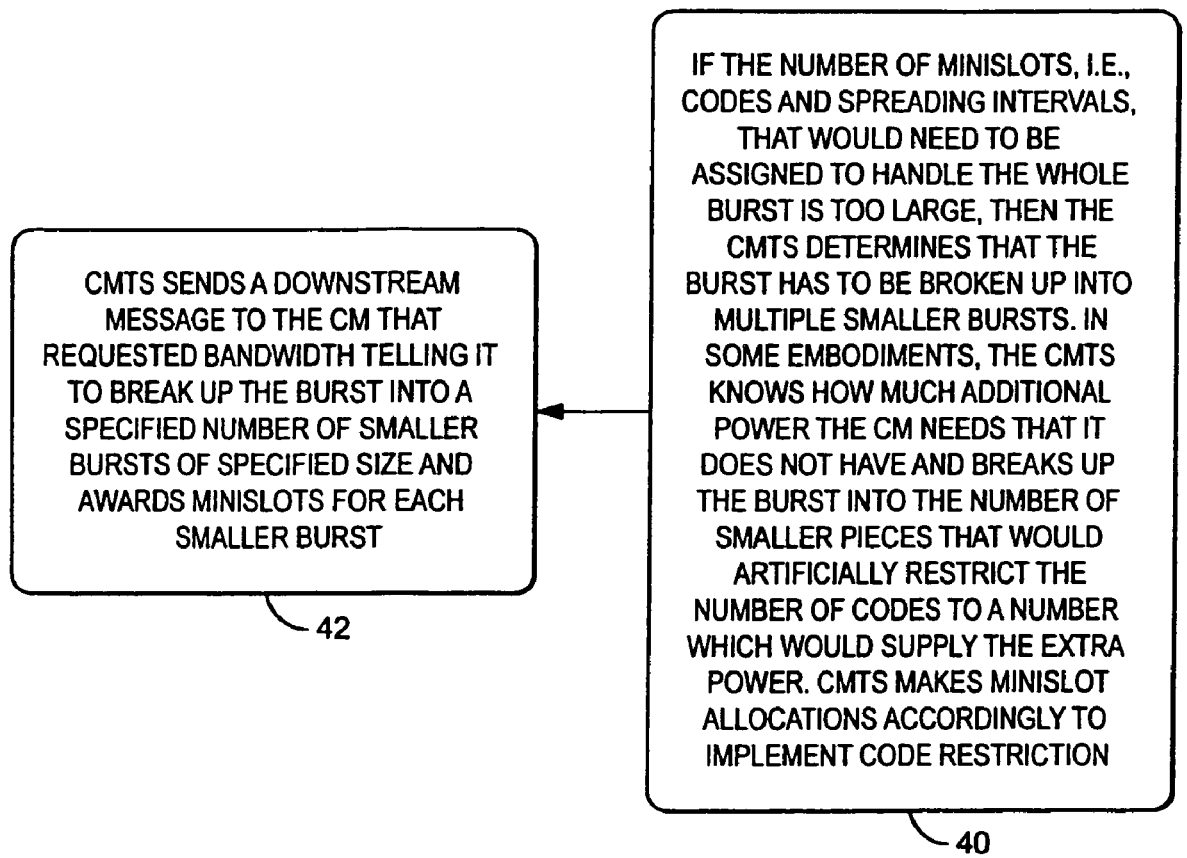

The sequence of events that occurs in an improved training system that implements the invention in a DOCSIS CDMA system employing the invention is shown in FIGS. 4A through 4C. Step 10 represents the process carried out by the CMTS modem opens an initial training window by sending an invitation to all cable modems (CM) transmit IUC3 initial ranging bursts. This invitation tells all CMs the time and duration of an initial training window in terms of upstream minislot numbers that define the window. Step 12 represents each CM that needs to accomplish ranging sending an initial training burst during what it thinks is the initial training window specified by the CMTS. Both the CMTS and the CMs have upstream minislot counters, but before a CM does initial training, its upstream minislot counter may be offset from the master upstream minislot counter in the CMTS. Part of the initial training is to calculate an offset for each CM to achieve alignment in these counters. The initial training burst serves this purpose, and is sent at a low initial power level. This training burst includes known preamble symbols and an ID code for the CM that sent the burst.

Step 14 represents the process carried out in CMTS on each training burst it successfully receives. One thing that is done by the CMTS is to measure the power of the burst. Even if a CM has a headroom problem, the initial training burst and subsequent training bursts can still be received with power as low as 10 dB below nominal or desired power since these training bursts are modulated using a simple QPSK constellation. The CMTS also measures the time offset between the arrival of the burst from each CM and a reference time in the initial training window and sends this offset value to the CM that transmitted the burst so as to achieve upstream minislot boundary synchronization for each CM. The known preamble data in each initial training burst is also used to calculate upstream equalization filter coefficients for the CM that sent the burst and phase and amplitude correction factors for subsequent use in receiving symbols transmitted in the more complex constellations used for transmitting payload data. The CMTS also then calculates upstream equalization coefficients for the CM from the preamble data and sends those coefficients back down to the CM for use in an upstream equalization filter for subsequent bursts. The CMTS also calculates phase and amplitude error correction factors for each CM that sent a training burst from the known preamble data for use in receiving symbols subsequently transmitted by that CM.

The CMTS in step 16 then sends the offset it calculated in step 14 to each CM, and, for CMs that had bursts which were too low in power, the CMTS also sends a request to increase the transmission power of subsequent bursts. The CMTS also makes a record of each CM that has been instructed to increase its power.

In step 18, if a CM does not receive a feedback message from the CMTS in response to its initial ranging burst, the CM assumes that either there was a collision between its initial ranging burst and the ranging burst of another CM or that the power it used to send the initial burst was too low. The CM responds to not receiving a feedback message by both increasing the power level for the next training burst to be sent by one power level and by performing a random backoff interval during which it will not send any further initial training bursts in response to invitations so as to avoid collisions. After the backoff interval has expired, the CM sends another initial ranging burst in response to the next invitation from the CMTS at the next power level up from the power level of the first training burst and listens for a feedback message. The process of steps 10 through 18 is repeated multiple times until an initial training burst is received successfully from each CM.

Step 20 represents the process carried on in the CMTS after it successfully received an initial IUC3 training/ranging burst from a CM. Step 20 is carried out for each CM that has successfully completed its initial training. In step 20, the CMTS periodically allocates to each CM a group of contiguous minislots that define a smaller station maintenance window that is dedicated to receive station maintenance bursts transmitted just by one designated CM. The CMTS then sends an invitation to send an IUC4 periodic station maintenance burst during that window.

In step 22, the CM that has received such an invitation sends a periodic station maintenance burst during the designated window. If the CM has been instructed to increase its power by the CMTS either after the initial training burst or with the invitation to send a periodic station maintenance burst, the CM attempts to increase its power by the amount specified by the CMTS and sends the periodic station maintenance burst. Step 22 is repeated by every CM that has received a designated periodic station maintenance burst window and an invitation to send an IUC4 burst.

In step 24, the CMTS receives the periodic station maintenance burst from each CM during the designated window and measures the power of the burst again. The CMTS also uses the periodic station maintenance burst to fine tune the CM's offset and upstream equalization coefficients.

Step 26 represents processing in the CMTS that determines if the power measured in step 24 for the periodic station maintenance burst sent by a CM is too low. This step is performed for each CM. If the power of a periodic station maintenance burst from a particular CM was too low, the CMTS sends that CM another message asking it to increase its power again. The CMTS then makes a record of this request including the ID of the CM to which the request was made. The newly calculated ranging offset and upstream equalization filter coefficients are also sent downstream to the particular CMs to which they pertain in step 26. In each CM which received refined equalization coefficients, the refined equalization coefficients are convolved with the upstream equalization coefficients currently in use by said CM to derive new upstream equalization coefficients and using those for subsequent bursts, and adjusting a ranging offset used by the CM using the refined ranging offset.

In step 28, the CMTS opens a second round of periodic station maintenance windows for the CMs which have successfully completed initial training, and sends a downstream invitation to each CM requesting it to send another periodic station maintenance burst during its designated periodic station maintenance window. The invitation to each CM tells it when its periodic station maintenance window is in terms of minislot numbers.

In step 30, each CM which has received such an invitation for a second round periodic station maintenance burst responds by sending another periodic station maintenance burst during its assigned window.

In step 32, the CMTS again measures the power of each periodic station maintenance burst, and, if the power is still too low, determines if the particular CM which sent the burst has been instructed at least twice before to increase its power level. In other embodiments, any reasonable predetermined number of prior requests can be used as the reference number to draw the conclusion. If the CM has been previously requested to increase its transmit power at least the predetermined number of times selected as the reference, the CMTS determines that the CM has a headroom problem and notes the CM ID in a list of CMs with headroom problems.

Step 34 represents the process of the CMs both with and without headroom problems receiving upstream data that needs to be transmitted to the CMTS and transmitting bandwidth requests to the CMTS indicating how much data is to be sent in the requested burst. For CMs without headroom problems, the CMTS just allocates the necessary bandwidth, and that is the end of it.

However, for the CMs that have headroom problems, more processing by the CMTS to resolve that problem is necessary. Step 36 represents the beginning of that process in the CMTS for CMs that have headroom problems. In step 36, the CMTS receives the bandwidth requests from CMs with headroom problems, and looks up the CM ID in each request in the CMTS list of CMs that have headroom problems. This happens for the CMs that do not have headroom problems also, but since their IDs are not on the list, processing branches off to normal processing for those CMs. Step 36 is done to determine which upstream burst requests come from CMs that have headroom problems so that appropriate processing to resolve those problems can be performed. For CMs with headroom problems, a subsequent examination of the desired burst size will be necessary to determine the amount of restriction needed.

In step 38, the CMTS examines the requested burst size for CMs that have headroom problems.

In step 40, the CMTS determines if the number of minislots that would have to be allocated to send the requested burst size from a CM with a headroom problem is too large. This is done because the number of minislots maps linearly to the number of spreading intervals and codes needed to send the burst. It is the number of codes necessary to send the requested burst size that is important, because that is how the headroom problem is solved. Basically, the headroom problem is solved by limiting the number of codes that will be simultaneously used to transmit a burst to a number which divides the total available transmit power from a particular CM by a small enough number that the power devoted to each code is sufficient for reliable reception. In the preferred embodiment, the CMTS knows how much additional power is needed to solve the headroom problem of each CM, so it can calculate based upon the number of codes needed to transmit the required burst size, how much code restriction is needed to increase the power transmitted per code to meet a nominal power specification. Step 40 represents the process of determining the maximum number of codes that can be used simultaneously to transmit a burst from a CM with a headroom problem to solve that headroom problem. Once this maximum number of codes is figured out, the requested burst size is divided into smaller segments of sizes that map to the maximum allowable number of codes or fewer. In other embodiments, the CMTS can just do a trial and error process and divide the requested burst up into smaller bursts and allocate minislots accordingly. Then, if the burst segments received still are not received reliably, the CMTS can break the burst segments up into smaller burst segments and have the CM retransmit the data until all of the data is reliably received. This alternative embodiment is also represented by step 40.

Step 42 represents the process of allocating minislots to each CM that has requested to send a burst, and sending messages downstream to the CMs giving them allocated minislots in which to send their bursts. In the preferred embodiment, each messages to a CM that has a headroom problem will allocate only a number of minislots adequate to send a fragment of the requested burst which is small enough to solve the headroom problem. Subsequent messages will allocate enough minislots to the CM to send the subsequent burst fragments until all the data of the burst of the original request is sent.

Figure 5:
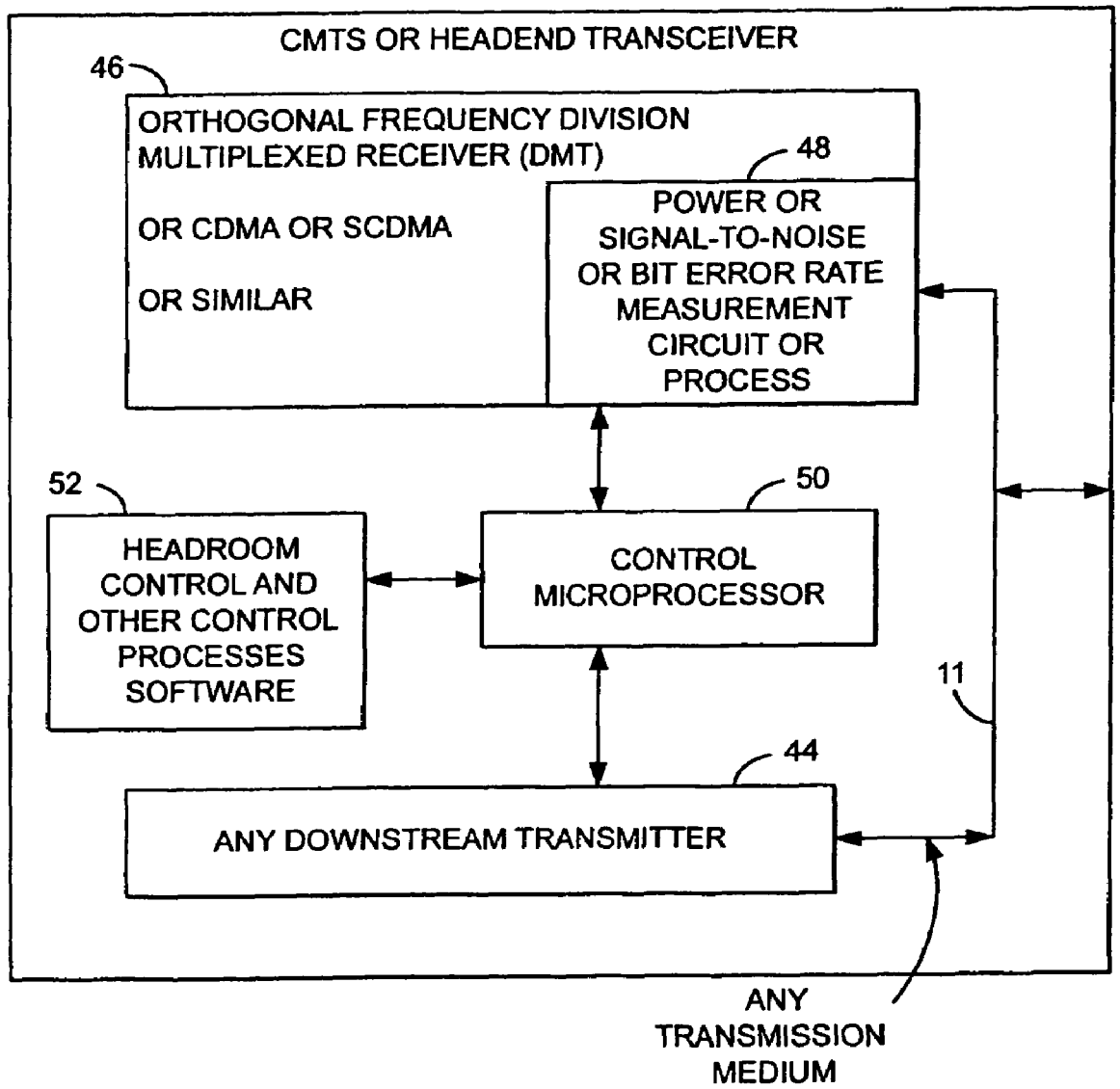
FIG. 5 is a block diagram illustrating an embodiment of a transceiver according to one or more aspects of the present invention.

FIG. 5 is a block diagram that defines the genus of a headend transceiver apparatus within the apparatus genus of the invention. The species within this genus can be used in various distributed systems with multiple remote transmitters which deliver digital data to the headend transceiver apparatus by simultaneously transmitting on a plurality of logical channels. The apparatus of FIG. 5 is comprised of any type of downstream transmitter 44 which transmits downstream signals on any transmission medium 11 such as HFC, cellular or other wireless, satellite downlink, etc. An upstream receiver 46 can be any orthogonal frequency division multiplexed receiver or CDMA or SCDMA receiver or a similar system with any other form of multiplexing which establishes multiple logical channels which are simultaneously used by remote transmitters. In other words, the invention is applicable in any system where multiplexing is used to establish multiple logical channels, and where most or all of those multiple logical channels are used simultaneously by a remote transmitter when it sends a burst to the headend. The receiver 46 will be whatever type of receiver is compatible with the type of multiplexing used.

However, the receiver 46 must have circuitry or processes 48 that can operate to measure the power, S/N ratio and/or bit error rate of upstream bursts from each remote transmitter. Circuitry or processes 48 provide the measurement information to a control microprocessor 50. The microprocessor 50 executes the software in memory 52 which includes a species of a headroom problem resolution procedure within the genus defined by the flowchart of FIGS. 3A and 3B. The control microprocessor uses the measurement information to make decisions in an algorithm to determine if a CM or remote has a headroom problem and to determine how much of a restriction on the logical channels must be imposed on assignment of logical channels to a CM or remote with a headroom problem. The control microprocessor generates downstream messages to the CMs or remotes with headroom problems and sends them via downstream transmitter 44.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A method of improving headroom in a digital data communication network, wherein data is transmitted over a plurality of logical channels, the method comprising:
   determining that a remote transceiver has a headroom problem;
   dividing a total transceiver power of the remote transceiver among fewer logical channels than the plurality of logical channels; and
   transmitting on each of the fewer logical channels with sufficient power to overcome the headroom problem.

2. The method of claim 1, wherein the digital data communication network is a distributed code division multiplexed network.

3. The method of claim 1, wherein the digital data communication network is an orthogonal frequency division multiplexed network.

4. The method of claim 2, wherein the remote transceiver is part of a cable modem.

5. The method of claim 3, wherein the remote transceiver is part of a cable modem.

6. The method of claim 2, further comprising restricting spreading codes to a limited number of spreading codes that are allocated to any remote transceiver having a headroom problem, wherein the dividing of the total transmit power further comprises dividing the total transmit power among fewer logical channels, and wherein the transmitting further comprises transmitting simultaneously on each spreading code.

7. The method of claim 3, further comprising restricting frequency carriers to a limited number of carriers that are allocated to any remote transceiver having a headroom problem, wherein the dividing of the total transmit power further comprises dividing the total transmit power among fewer logical channels, and wherein the transmitting further comprises transmitting simultaneously on each carrier.

8. A method for improving headroom in a digital data communication network having a headend transceiver, the method comprising:
   obtaining a request for a burst to the headend transceiver from a remote transceiver;
   calculating how many burst fragments to divide the burst to make each burst fragment sufficiently small such that the burst can be transmitted with a sufficiently small number of spreading codes to reduce a headroom problem; and
   authorizing transmission of burst fragments, wherein each burst fragment is sufficiently small such that a sufficiently small number of codes are mapped to the burst fragment to reduce a headroom problem.

9. The method of claim 8, further comprising setting a maximum scheduled codes, wherein the maximum scheduled codes is a limit on a number of codes the remote transceiver is required to simultaneously transmit, and wherein the sufficiently small number of spreading codes is not more than the maximum scheduled codes.

10. The method of claim 8, wherein the obtaining the request for the burst comprises:
    obtaining an upstream bandwidth request including a requested size of burst; and
    determining that the requested size of burst is at least a size which could cause a headroom problem for the remote transceiver.

11. The method of claim 10, wherein the obtaining the upstream bandwidth request comprises:
    calculating at the remote transceiver the upstream bandwidth request including the requested size of burst; and
    obtaining the upstream bandwidth request from the remote transceiver.

12. The method of claim 10, wherein the obtaining the upstream bandwidth request further comprises:
    calculating at the headend transceiver the upstream bandwidth request including the requested size of burst; and
    obtaining the upstream bandwidth request from a processor of the headend transceiver.

13. The method of claim 10, wherein the determining that the requested size of burst is at least a size which could cause a headroom problem is carried out by the headend transceiver, the method further comprising the headend transceiver:
    determining that the particular remote transceiver has a headroom problem; and
    calculating a power shortfall for the particular remote transceiver having the headroom problem.

14. The method of claim 10, wherein the determining that the requested size of burst is at least a size which could cause a headroom problem is carried out by a particular remote transceiver, the method further comprising the particular remote transceiver:
    determining that the particular remote transceiver has a headroom problem; and
    calculating a power shortfall for the particular remote transceiver having the headroom problem.

15. The method of claim 13, wherein the headed transceiver determines that the particular remote transceiver has the headroom problem by:
    measuring a power of a training burst received from the particular remote transceiver;
    determining that the power of the training burst is less than a nominal power level;
    sending a request to the particular remote receiver to increase a power of a next training burst;
    measuring the power of the next training burst;
    determining that the power of the next training burst is less than the nominal power level; and
    concluding that the particular remote transceiver has the headroom problem.

16. The method of claim 14, wherein the particular remote transceiver determines that the particular remote transceiver has the headroom problem by:
    measuring a power of a training burst of the particular remote transceiver;
    determining that the power of the training burst is less than a nominal power level;
    increasing a power of the next training burst;

determining that the power of the next training burst is less than the nominal power level; and concluding that the particular remote transceiver has the headroom problem.

17. The method of claim 13, wherein the headend transceiver determines that the particular remote transceiver has the headroom problem by:

measuring a bit error rate of a training burst received from the particular remote transceiver;

attempting to reduce the bit error rate of the training burst;

determining that the bit error rate is too high; and concluding that the particular remote transceiver has the headroom problem.

18. The method of claim 17, further comprising attempting to reduce the headend problem by sending a request to the particular remote transceiver to increase a power level of a next training burst.

19. The method of claim 18, wherein the particular remote transceiver determines that the particular remote transceiver has the headroom problem by:

measuring a bit error rate of a training burst of the particular remote transceiver;

attempting to reduce the bit error rate of the training burst;

determining that the bit error rate is too high; and concluding that the particular remote transceiver has the headroom problem.

20. The method of claim 19, further comprising attempting to reduce the headend problem by increasing a power level of a next training burst.

21. A cable modem termination system comprising:

a receiver configured to obtain a request for a burst from a remote transceiver;

a computer coupled to the receiver; and a transmitter coupled to the computer, wherein the transmitter is configured to transmit an authorization of transmission of burst fragments, wherein each burst fragment is sufficiently small such that a sufficiently small number of codes are mapped to the burst fragment to reduce a headroom problem.

22. The cable modem termination system of claim 21, wherein the request for a burst includes an upstream bandwidth request having a requested size of burst the remote transceiver calculates to send.

23. The cable modem termination system of claim 21, wherein the request for a burst includes an upstream bandwidth request having a requested size of burst the cable modem termination system calculates for the remote transceiver to send.

24. The cable modem termination system of claim 22, wherein the remote transceiver is configured to determine if the requested size of burst is at least a size which could cause a headroom problem for the remote transceiver, and to calculate how many burst fragments to divide the burst to make each burst fragment sufficiently small that the burst can be transmitted with a sufficiently small number of spreading codes to reduce a headroom problem.

25. The cable modem termination system of claim 23, wherein the computer is configured to determine if the requested size of burst is at least a size which could cause a headroom problem for the remote transceiver, and to calculate how many burst fragments to divide the burst to make each burst fragment sufficiently small that the burst can be transmitted with a sufficiently small number of spreading codes to reduce a headroom problem.

26. A cable modem termination system comprising:

a receiver configured to receive a burst from a remote transceiver;

a computer coupled to the receiver; and a transmitter coupled to the computer, wherein the transmitter is configured to send to the remote transceiver a restricted number of upstream logical channels which will reduce a headroom problem.

27. The cable modem termination system of claim 26, wherein the computer is configured to measure a quantity associated with the burst, to determine based on the quantity if the remote transceiver has a headroom problem, calculating a restricted number of upstream logical channels which can be assigned to the remote transceiver in order to reduce a headroom problem.

28. The cable modem termination system of claim 26, wherein the remote transceiver is configured to measure a quantity associated with the burst, to determine based on the quantity if the remote transceiver has a headroom problem, calculating a restricted number of upstream logical channels which can be assigned to the remote transceiver in order to reduce a headroom problem.

29. The cable modem termination system of claim 26, wherein the quantity associated with the burst request is a power level of the burst received from the remote transceiver.

30. The cable modem termination system of claim 26, wherein the quantity associated with the burst request is a signal-to-noise ratio of the burst received from the remote transceiver.

31. The cable modem termination system of claim 26, wherein the quantity associated with the burst request is a bit error rate of the burst received from the remote transceiver.

* * * * *